United States Patent Office 3,808,213
Patented Apr. 30, 1974

3,808,213
2,2-DIPHENYL-2-PROPARGYLACETAMIDES
François Clemence, Rosny-sous-Bois, and Odile Le Martret, Paris, France, assignors to Roussel-UCLAF, Paris, France
No Drawing. Filed Oct. 28, 1971, Ser. No. 193,560
Claims priority, application France, Nov. 16, 1970, 7040966
Int. Cl. C07d 51/70; C07c 103/22
U.S. Cl. 260—268 C 6 Claims

ABSTRACT OF THE DISCLOSURE

A compound selected from the group consisting of acetamides of the formula

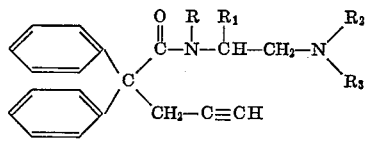

I wherein R is selected from the group consisting of hydrogen and alkyl of 1 to 4 carbon atoms, $R_1$ is hydrogen, $R_2$ is alkyl of 1 to 4 carbon atoms and $R_3$ is selected from the group consisting of alkyl of 1 to 4 carbon atoms, aryl and aralkyl or the group

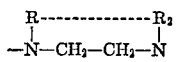

may form a 6-membered nitrogen-containing heterocyclic or the group

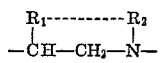

may form a 6-membered nitrogen-containing heterocyclic or the group

may form a 5- to 6-membered, nitrogen-containing heterocyclic optionally containing another hetero-atom and their non-toxic, pharmaceutically acceptable acid addition salts which have intense analgesic activity and act as potentializers for neuro-sedatives and their preparation and intermediates thereof.

STATE OF THE ART

French BSM Pat. No. 5,901 M describes N-methyl-N-[β-(N'-methyl-N'-phenethylamino)ethyl] - 2 - propargyl-oxy-2,2-diphenyl-acetamide which is devoid of analgesic activity and acts as a central nervous system depressant. When administered to animals, it reduces their motility or their awarenes.

OBJECTS OF THE INVENTION

It is an object of the invention to provide the novel acetamides of Formula I and their acid addition salts.
It is another object of the invention to provide a novel process for the preparation of the compounds of Formula I and novel esters and acid intermediates.
It is an additional object of the invention to provide novel analgesic compositions and to provide improved neuro-sedative compositions.
It is another object of the invention to provide a novel method of inducing neuro-sedative properties in warm-blooded animals.
It is another object of the invention to a novel method of inducing neuro-sedative properties in warm-blooded animals.

These and other objects and advantages of the invention will become obvious from the following detailed description.

THE INVENTION

The novel compounds of the invention are selected from the group consisting of acetamides of the formula

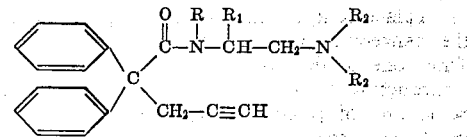

wherein R is selected from the group consisting of hydrogen and alkyl of 1 to 4 carbon atoms, $R_1$ is hydrogen, $R_2$ is alkyl of 1 to 4 carbon atoms and $R_3$ is selected from the group consisting of alkyl of 1 to 4 carbon atoms, aryl and aralkyl or the group

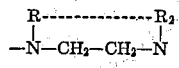

may form a 6-membered nitrogen-containing heterocyclic or the group

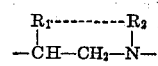

may form a 6-membered nitrogen-containing heterocyclic or the group

may form a 5- to 6-membered, nitrogen-containing heterocyclic optionally containing another hetero-atom and their non-toxic, pharmaceutically acceptable acid addition salts.

Examples of suitable compounds of Formula I are the following compounds and their hydrochloric acid addition salts:

N-(diethylaminoethyl)-2,2-diphenyl-2-propargly-acetamide,
N-methyl-N-(N'-methyl-phenethylaminoethyl)-2,2-diphenyl-2-propargyl-acetamide,
N-methyl-N-(β-pyrrolidinoethyl)-2,2-diphenyl-2-propargyl-acetamide,
N-(1'-ethyl-3'-piperidyl)-2,2-diphenyl-2-propargyl-acetamide, and
N'-benzyl-N-(2,2-diphenyl-pent-4-yneoyl)-piperazine.

Examples of non-toxic, pharmaceutically acceptable acid addition salts are mineral acids such as sulfuric acid, hydrochloric acid, etc., and organic acids such as acetic acid, citric acid, tartaric acid, etc.

The novel process of the invention for the preparation of the compounds of Formula I comprises reacting an ester of diphenylacetic acid of the formula

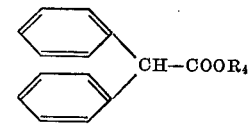

II wherein $R_4$ is selected from the group consisting of alkyl of 1 to 5 carbon atoms and aralkyl of 1 to 5 alkyl carbon atoms with a strong alkali metal base selected from the group consisting of alkali metal amides, alkali metal hydrides and alkali metal dialkylamides and then with a compound of the formula

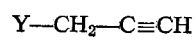 III wherein Y is selected from the group consisting of chlorine, bromine, iodine and aryl SO₃— to obtain a compound of the formula

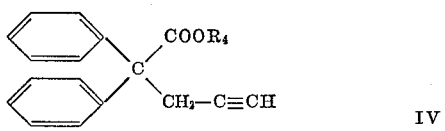

saponifying the latter to form 2,2-diphenyl-2-propargylacetic acid, conventing the latter into an acylating derivative and reacting the latter with a diamine of the formula

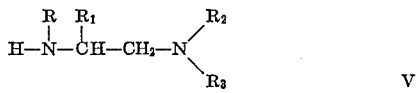

wherein R, $R_1$, $R_2$ and $R_3$ have the above definitions to form the free base of Formula I which can be treated in a usual way with an organic or mineral acid to form the corresponding acid addition salts.

In a preferred mode of the process, benzyl 2,2-diphenylacetate is reacted with sodium amide and then propargyl bromide to form benzyl 2,2-diphenyl-2-propargyl-acetate, the latter is saponified with an alkali metal hydroxide such as potassium hydroxide to form the corresponding free acid, the said acid is reacted with thionyl chloride to form the corresponding acid chloride and the acid chloride is then reacted with the appropriate diamine.

The esters of Formula II can be prepared by the process described in Beilstein, vol. 9, p. 673.

The compounds of Formula I and their non-toxic, pharmaceutically acceptable acid addition salts exhibit remarkable pharmacological properties and are particularly distinguished by very intense analgesic properties. They also possess very interesting potentializing properties of the action of neuro-sedatives. Due to their very low toxicity, they can be added to barbiturates or to neuroleptics without risk of disturbing side effects. The compounds do not exhibit a depressant effect at the therapeutic doses. Finally, they not only intervene on the duration of the sleeping time caused by hypnotics but also intervene on the rapidity of the time of falling asleep and they clearly diminish the time necessary for the appearance of muscular relaxation indicative of sleep.

The novel analgesic compositions of the invention are comprised of an analgesically effective amount of at least one compound of Formula I and its non-toxic, pharmaceutically acceptable acid addition salts and a pharmaceutical carrier. The usual individual dose is 0.05 gm. to 0.25 gm. with a daily adult dose of 0.1 to 1.0 gm. depending upon the specific compound and its method of administration. The compositions may be in the form of injectable solutions or suspensions, tablets, coated tablets, capsules, syrups or suppositories.

The analgesic compositions may also contain other active compounds such as antalgics, anti-pyretic or agents to insure better diffusion in the organism or better tissue penetration. Examples of compounds to improve passage through mucous membranes or tissue diffusion are N-acetyl-cysteine, cysteine, N-benzyl-cysteine and sodium hexametaphosphate.

The compositions of the invention are comprised of (A) a neuro-sedative, a hypnotic or a neuroleptic, (B) one or more compounds of Formula I or their non-toxic, pharmaceutically acceptable acid addition salts. The preferred weight ratio of A to B is 0.5:1 to 10:1.

Examples of neuro-sedatives, are sodium 5-allyl-5-(1'-methylbutyl) barbiturate, 5-ethyl - 5 - isoamyl-barbituric acid, 2-methyl-3-o-chlorophenylquinazoline - 4 - one, 2-methyl-3-o-tolyl-quinazoline-4-one and 2 - methyl-2-propyl-1,3-propanediol dicarbamate.

Preferred examples are compositions containing one part by weight of the compound of Formula I to 5 parts by weight of a barbiturate or 3 to 8 parts of a hypnotic such as mecloqualone, methaqualone or 2-methyl-2-propyl-1,3-propanediol dicarbamate.

The novel method of relieving pain in warm-blooded animals comprising administering an analgesic amount of at least one compound of Formula I and its non-toxic, pharmaceutically acceptable acid addition salts. The said compound may be administered orally, rectally or parenterally. The usual daily dose is 1.6 to 16 mg./kg.

The novel method of inducing neuro-sedative symptoms in warm blooded animals comprises administering to warm-blooded animals an effective amount of a neuro-sedative and a potentializing amount of a compound of Formula I or its non-toxic, pharmaceutically acceptable acid addition salts.

In the following examples there are described several preferred embodiments to illustrate the invention. However, it is to be understood that the invention is not intended to be limited to the specific embodiments.

EXAMPLE I.—PREPARATION OF DIPHENYL-PROPARGYLACETIC ACID

Step A: Benzyl diphenylpropargylacetate

A suspension of 164.2 gm. of sodium amide in 1.400 liters of ether was mixed with a solution of 604 gm. of benzyl diphenylacetate [obtained by process described by Vaillant, Ann. Chimie Paris, vol. 9, pp. 5–49, 1954] in 2 l. of ether and the mixture was refluxed for 6 hours. The mixture was cooled to 0° C. and a solution of 237.8 gm. of propargyl bromide in 1.200 liters of benzene was added while maintaining the temperature of 0° C. The reaction mixture was allowed to stand overnight and the ethereal phases were washed with water until the wash water was neutral, dried over magnesium sulfate, treated with activated charcoal, filtered and evaporated to dryness in vacuo to obtain 630 gm. of benzyl diphenylpropargylacetate (93% yield) which was used as is in the following step. The product occurred as a yellow liquid soluble in acetone, ether and toluene, slightly soluble in ethanol and insoluble in water.

As far as it is known, this compound is not described in the literature.

Step B: Diphenylpropargylacetic acid

A solution of 205 gm. of potassium hydroxide in pellets in 400 ml. of water and 1800 ml. of ethanol was mixed with a solution of 630 gm. of benzyl diphenylpropargylacetate in 2700 ml. of ethanol and the mixture was refluxed for 3 hours. The reaction mixture was allowed to stand overnight, and the ethanol was evaporated off in vacuo. 4 l. of water were added, thereto and the formed benzyl alcohol was removed by extraction with ether. The aqueous phase was treated with activated charcoal, and the pH was adjusted to 1 by addition of hydrochloric acid. The mixture was extracted with ether and the ethereal phase was washed with water, dried over magnesium sulfate, treated with activated charcoal, filtered and evaporated to dryness in vacuo. The residue was crystallized from toluene to obtain 194 gm. of diphenylpropargylacetic acid. The product occurred in the form of colorless crystals soluble in ether, methanol and acetone, slightly soluble in toluene and insoluble in water and melting at 175° C.

As far as it is known, this compound has not been described in the literature.

EXAMPLE II.—PREPARATION OF 2,2-DIPHENYL-PROPARGYL - N - (DIETHYLAMINO ETHYL) ACETAMIDE AND ITS HYDROCHLORIDE

Step A: 2,2-diphenyl 2-propargylacetic acid chloride 15 gm. of 2,2-diphenyl-2-propargylacetic acid and 60 ml. of thionyl chloride were mixed with agitation and cooling and then the suspension was heated at 50° C. for 1 hour and 15 minutes. The mixture was brought back to room temperature and the excess of thionyl chloride evaporated off. The mixture was extracted with ether and evaporated to dryness to obtain 16.8 gm. of 2,2-diphenyl-2-propargylacetic acid chloride.

As far as it is known, this compound has not been described in the literature.

Step B: Condensation 16.8 gm. of the acid chloride obtained above were dissolved in 60 ml. of benzene and a solution of 6.85 gm. of diethylaminoethylamine in 60 ml. of benzene was added thereto with agitation and keeping the temperature at 15° C. The mixture was agitated at room temperature for 7 hours and then allowed to stand for 36 hours. The benzene phase was decanted off and extracted with water. To the oily residue and to the combined aqueous phases, 35 ml. of a 20% aqueous solution of potassium carbonate and 60 ml. of water were added, and then were extracted with ether. The ethereal phases were washed with water until the wash water was neutral, dried over magnesium sulfate, treated with activated charcoal, filtered and evaporated to dryness to obtain 14.3 gm. of an oily residue. Hydrochloric acid was added to the residue followed by 400 ml. of ether. The ether was decanted off and the resulting precipitate was dissolved in hot ethyl acetate and then in methyl ethyl ketone. 35 ml. of 20% aqueous solution of potassium carbonate and 60 ml. of water were added thereto and the mixture was extracted with ether. The ethereal phases were washed with water, dried over magnesium sulfate, treated with activated charcoal and evaporated to dryness to obtain 11.7 gm. of 2,2-diphenyl-2-propargyl-N-(diethylaminoethyl)-acetamide in the form of an oil.

As far as it is known, this compound has not been described in the literature.

To 11 gm. of 2,2-diphenyl - 2 - propargyl-N-(diethylaminoethyl)-acetamide, the theoretical amount of hydrochloric acid in an ethanol solution having a titer of 0.031 mol was added and the ethanol was evaporated off. Ether was added, and the ether was decanted off. The resulting precipitate was crystallized from methyl ethyl ketone to obtain 9.05 gm. of 2,2-diphenyl-2-propargyl-N-(diethylaminoethyl)-acetamide hydrochloride in the form of colorless crystals melting at 144.5° C. The product was soluble in water and chloroform, rather soluble in ethanol, slightly soluble in benzene and insoluble in ether.

Analysis: $C_{23}H_{28}N_2O \cdot HCl$; molecular weight=384.94. Calculated (percent): C, 71.76; H, 7.4; Cl, 9.21; N, 7.28. Found (percent): C, 71.6; H, 7.4; Cl, 9.4; N, 7.4.

I.R. spectrum-KBr: Peaks at 3320 3230, 2940, 2660 and 1660 $cm.^{-1}$ to 1520 $cm.^{-1}$.

As far as it is known, this compound has not been described in the literature.

EXAMPLE III—PREPARATION OF 2,2-DIPHENYL-2-PROPARGYL-(N'-METHYL - PHENETHYLAMINOETHYL)-METHYLACETAMIDE AND ITS HYDROCHLORIDE 135 gm. of diphenylpropargylacetic acid chloride were dissolved at 15° C. in 500 ml. of benzene and a solution of 91.35 gm. of N-methyl-N-[β-(N'-methyl-N'-phenethylamino)-ethyl]amine [obtained by the process in the French BSM Pat. No. 5901 M] in 500 ml. of benzene was added. The mixture was agitated for 4 hours and 20 minutes and the crystals were recovered by vacuum filtration, were washed with ether and dried for 3 hours in the oven in vacuo. The crystals were dissolved in 650 ml. of a 10% aqueous solution of potassium carbonate and 1 liter of ether was added thereto. The mixture was agitated until complete solution occurred and the aqueous layer was extracted with ether. The combined ethereal solutions were washed with water, dried over magnesium sulfate, treated with activated charcoal, filtered and evaporated to dryness. The crystals were empasted with petroleum ether, vacuum filtered and dried in vacuo for 3 hours. After crystallization from isopropanol, 141 gm. of 2,2 - diphenyl-2-propargyl-(2'-methylphenethylaminoethyl)-methyl-acetamide melting at 70° C. were obtained.

As far as it is known, this compound has not been described in the literature.

The 141 gm. of the said acetamide were dissolved in 760 ml. of ethanol cooled to +10° C., and then 78.38 ml. of a 4.3 N ethanol solution of hydrochloric acid were added. The mixture was agitated for 15 minutes at +10° C. and then for 3 hours at room temperature. The solution was concentrated until crystallization began and the crystals were recovered by vacuum filtration and were washed with cold ethanol, then with ether and dried in vacuo. After crystallization from isopropanol, 123 gm. of 2,2-diphenyl - 2 - propargyl-(2'-methyl-phenethylaminoethyl)-methyl-acetamide hydrochloride melting at 151° C. were obtained. The product occurred as colorless crystals soluble in methanol, ethanol, chloroform and acetone, slightly soluble in benzene and insoluble in water and ether.

Analysis: $C_{29}H_{33}ClN_2O$; molecular weight=461.03. Calculated (percent): C, 75.55; H, 7.21; Cl, 7.69; N, 6.08. Found (percent): C, 75.60; H, 7.2; Cl, 8; N, 6.1.

As far as it is known, this compound has not been described in the literature.

EXAMPLE IV—PREPARATION OF 2,2-DIPHENYL-2-PROPARGYL-N-METHYL-N-(β - PYRROLIDINOETHYL)-ACETAMIDE AND ITS HYDROCHLORIDE 18.40 gm. of diphenyl-propargylacetic acid chloride were dissolved in 50 ml. of benzene and a solution of 6.41 gm. of N-methyl N-(β-pyrrolidinoethyl) amine in 50 ml. of benzene was added while maintaining the temperature at +15° C. 30 ml. of benzene were added thereto and the mixture was agitated at room temperature for 3 hours and allowed then to stand overnight. The resulting precipitate was recovered by vacuum filtration and then 200 ml. of water and 60 ml. of a 20% aqueous solution of potassium carbonate were added to bring the pH to 10. The mixture was extracted with ether, and the ethereal phases washed with water, dried over magnesium sulfate, treated with activated charcoal, filtered and evaporated to dryness to obtain 12 gm. of 2,2-diphenyl-2-propargyl - N - methyl-N-(β-pyrrolidinoethyl)-acetamide melting at 80° C.

As far as it is known, this compound has not been described in the literature.

11 gm. of the said acetamide were dissolved in 45 ml. of ethanol and the theoretical quantity of hydrochloric acid in ethanol solution was added thereto. The precipitate was recovered by vacuum filtration and was crystallized from ethanol to obtain 10.45 gm. of the 2,2-diphenyl-2-propargyl-N-methyl-N-(β-pyrrolidinoethyl)-acetamide hydrochloride melting at 232° C. The product occurs as colorless crystals soluble in water and chloroform, quite soluble in methanol, slightly soluble in ethanol and insoluble in ether and benzene.

Analysis: $C_{24}H_{28}N_2O \cdot HCl$; molecular weight=396.94. Calculated (percent): C, 72.61; H, 7.36; Cl, 8.93; N, 7.06. Found (percent): C, 72.8; H, 7.4; Cl, 9.1; N, 7.2.

U.V. spectrum (ethanol):

Max. at 255 nm.: $E_{1\,cm.}^{1\%}\} = 10.6$

Max. at 260 nm.: $E_{1\,cm.}^{1\%}\} = 11.6$

I.R. spectrum: Peaks at 3230, 2960, 2580, 2460, 1640 and 1500 $cm.^{-1}$.

As far as it is known, this compound has not been described in the literature.

EXAMPLE V—PREPARATION OF 2,2-DIPHENYL-2 - PROPARGYL - (N - 1'-ETHYL-3'-PIPERIDYL)-ACETAMIDE AND ITS HYDROCHLORIDE 10.13 gm. of diphenylpropargylacetic acid chloride were dissolved in 35 ml. of benzene and after a solution of 4.58 gm. of 1-ethyl-3-aminopiperidine in 35 ml. of benzene was added, the mixture was agitated for 2½ hours while keeping the temperature at +15° C. The mixture stood for 54 hours and was then filtered. 100 ml. of water and 30 ml. of a 20% aqueous solution of potassium carbonate were added to the precipitate to bring the pH to 10. The solution was extracted with ether and the ethereal phases were washed with water, dried over magnesium sulfate, treated with activated charcoal and evaporated to dryness to obtain 11 gm. of 2,2-diphenyl-2-propargyl-N-(1'-ethyl-3'-piperidyl - acetamide as a colorless oil.

As far as it is known, this compound has not been described in the literature.

The said acetamide was dissolved in 40 ml. of ether, and a stream of gaseous hydrogen chloride was passed through the solution, which was then filtered. The resulting precipitate was crystallized from ethanol to obtain 9 gm. of 2,2 - diphenyl - 2 - propargyl - N - (1'ethyl-3'-piperidyl) - acetamide hydrochloride melting at 230° C. The product occurred as colorless crystals soluble in chloroform and acetone, rather soluble in methanol, slightly soluble in water and ethanol, and insoluble in ether and benzene.

Analysis: $C_{24}H_{27}ON_2 \cdot HCl$; molecular weight=395.94. Calculated (percent): C, 72.80 H, 7.13 Cl, 8.95 N, 7.07. Found (percent): C, 72.5 H, 7.3 Cl, 8.9 N, 6.9.

U.V. spectrum (ethanol):

Max. at 262.5 nm.: $E_{1cm.}^{1\%} = 11.6$

I.R. spectrum-KBr: Peaks at 3420, 3300, 2950, 2620, 2540, 1670, 1540, 1440 and 710 cm.$^{-1}$.

As far as it known, this compound has not been described in the literature.

EXAMPLE VI—PREPARATION OF N' - BENZYL-N-(2,2 - DIPHENYL-PENT-4 - YNEOYL)-PIPERAZINE AND ITS HYDROCHLORIDE 9.5 gm. of diphenylpropargylacetic acid chloride were dissolved in 30 ml. of benzene with agitation at a temperature of +15° C., and then a solution of 5.28 gm. of 1-benzylpiperazine in 30 ml. of benzene was added. The agitation was continued for 3 hours at room temperature and the mixture was allowed to stand overnight and then was filtered. 200 ml. of water and 30 ml. of 20% aqueous solution of potassium carbonate were added to the precipitate and the mixture was extracted with ether, and then with chloroform. The organic phases were washed with water, dried over magnesium sulfate, treated with activated charcoal, filtered, and evaporated to dryness. The residue was crystallized from hexane to obtain 7 gm. of N'-benzyl - N - (2,2-diphenyl-pent-4-yneoyl)-piperazine.

As far as it is known, this compound has not been described in the literature.

6.85 gm. of the said base were dissolved in 500 ml. of ether, and the theoretical amount of hydrochloric acid in ethanol solution (0.061 mol) was added thereto. The precipitate was recovered by vacuum filtration and was crystallized from methyl ethyl ketone to obtain 6.28 gm. of N' - benzyl-N-(2,2-diphenyl-2-pent-4-yneoyl) - piperazine hydrochloride melting at about 200° C. The product occurred as colorless crystals soluble in ethanol and methanol and insoluble in water, ether and benzene.

Analysis: $C_{28}H_{28}N_2O \cdot HCl$ molecular weight=444.98. Calculated (percent): C, 75.57; H, 6.57, Cl, 7.97; N, 6.30. Found (percent): C, 75.1–74.9; H, 6.8–6.5; Cl, 8.2; N, 6.3.

U.V. spectrum (ethanol):

Max. at 258 nm.: $E_{1cm.}^{1\%} = 15$

I.R. spectrum-KBr: Peaks at 3310, 2500, 1640, 1420 and 700 cm.$^{-1}$.

As far as it is known, this compound has not been described in the literature.

PHARMACEUTICAL EXAMPLES

Example A—Tablet

|  | Mg. |
|---|---|
| 2,2 - diphenyl - 2 - propargyl-N-(diethylaminoethyl-acetamide hydrochloride | 20 |
| Secobarbital | 50 |
| Excipient, q.s. for a tablet with a total weight of 0.2 gm. | |

Example B—Tablet

|  | Mg. |
|---|---|
| 2,2 - diphenyl - 2-propargyl-N-(diethylaminoethyl-acetamide hydrochloride | 30 |
| Amobarbital | 100 |
| Excipient, q.s. for a tablet weighting 0.25 gm. | |

Example C—Tablet

|  | Mg. |
|---|---|
| 2,2 - diphenyl - 2 - propargyl-N-(diethylaminoethyl-acetamide hydrochloride | 80 |
| Mecloqualone | 80 |
| Excipient, q.s. for a tablet weighting 0.22 gm. | |

PHARMACOLOGICAL DATA (A) Potentiation of time of sleep

The potentiation of the length of time of sleep induced by amytal, secobarbital, methaqualone and mecloqualone was determined on groups of male mice weighing about 20 gm. The hypnotics was orally administered a dose level to induce a sleeping period of 25 to 35 minutes as a suspension in water containing gum arabic. Simultaneously, 2,2 - diphenyl - 2 - propargyl-N - (diethylaminoethyl)-acetamide hydrochloride as a suspension in water containing gum arabic was orally administred at doses of 10, 20 and 30 mg./kg. The duration of the sleep period was noted and the results are shown in Tables A to D. Secobarbital is the sodium salt of 5 - allyl-5-(1'methyl-butyl)-barbituric acid, amobarbital is 5-ethyl - 5 - isoamyl-barbituric acid, mecloqualone is 2-methyl - 3 - o - chlorophenyl - quinazoline - 4 - one and methaqualone is 2-methyl - 3 - o - tolyl-quinazoline-4-one.

A. Potentiation of secobarbital

| Product | Time of latency, minutes | Time of sleep, minutes |
|---|---|---|
| Secobarbital, 50 mg./kg | 7 | 30 |
| Secobarbital, 50 mg./kg Plus Tested product, 10 mg./kg | 7 | 73 |
|  |  | +143% |
| Secobarbital, 50 mg./kg Plus Tested product, 20 mg./kg | 7 | 82 |
|  |  | +173% |
| Secobarbital, 50 mg./kg Plus Tested product, 30 mg./kg | 5 | 151 |
|  |  | +403% |

B. Potentiation of amobarbital

| Product | Time of latency, minutes | Time of sleep, minutes |
|---|---|---|
| Amobarbital, 100 mg./kg | 9 | 24 |
| Amobarbital, 100 mg./kg Plus Test product, 10 mg./kg | 9 | 32 |
|  |  | +33% |
| Amobarbital, 100 mg./kg Plus Test product, 20 mg./kg | 9 | 31 |
|  |  | +29% |

| | | |
|---|---|---|
| Amobarbital, 100 mg./kg. Plus Test product, 30 mg./kg. | 12 | 64 |
| | | +167% |

C. Potentiation of mecloqualone

| Product | Time of latency, minutes | Time of sleep, minutes |
|---|---|---|
| Mecloqualone, 80 mg./kg. | 10 | 27 |
| Mecloqualone, 80 mg./kg. Plus Test product, 10 mg./kg. | 7 | 47 |
| | | +74% |
| Mecloqualone, 80 mg./kg. Plus Test product, 20 mg./kg. | 8 | 93 |
| | | +244% |
| Mecloqualone, 80 mg./kg. Plus Test product, 30 mg./kg. | 8 | 120 |
| | | +344% |

D. Potentiation of methaqualone

| Product | Time of latency, minutes | Time of sleep, minutes |
|---|---|---|
| Methaqualone, 100 mg./kg. | 7 | 36 |
| Methaqualone, 100 mg./kg. Plus Test product, 10 mg./kg. | 9 | 25 |
| | | —% |
| Methaqualone, 100 mg./kg. Plus Test product, 20 mg./kg. | 8 | 48 |
| | | +33% |
| Methaqualone, 100 mg./kg. Plus Test product, 30 mg./kg. | 9 | 57 |
| | | +58% |

(B) Analgesic activity

The analgesic activity of N-methyl N-(N'-methyl-phenethylaminoethyl) 2,2-diphenyl-2 - propargyl-acetamide hydrochloride with respect to thermal stimulus was determined with an apparatus consisting of a vessel dipped into a water bath held at 65° C. Mice were individually placed in the vessel and the time was measured for each animal for the licking of the front paw and jumping which was considered to be a reflex to pain sensation. Each test is accompanied by a control test. The test compound was administered subcutaneously to the animal 45 minutes before the start of the test. The average reaction time was determined for each dose and the results are expressed as a percent increase of the reaction time. The results are in Table E.

TABLE E

| Dosage in mg./kg.: | Percent increase of reaction time |
|---|---|
| 20 | 20 |
| 100 | 73 |
| 500 | 88 |

The analgesic activity of the same compound with respect to chemical stimulus was determined on groups of mice. The test compound was administered subcutaneously as an aqueous suspension a half hour before the intraperitoneal administration of 0.2 ml./20 gm. of animal weight of a 3% acetic acid solution to release the pain syndrome. The number of animals showing no pain reaction in the hours after the injection was noted.

The results of Table F are expressed as percent of protection compared to controls.

TABLE F

| Dosage in mg./kg.: | Percentage of protection |
|---|---|
| 10 | 27 |
| 20 | 80 |
| 100 | 85 |
| 500 | 86 |

The results of Tables E and F show that the said compound has a considerable analgesic activity regardless of the applied stimulus.

(C) Acute toxicity

The determination of the acute toxicity was made on 5 groups of male mice of Swiss strain, weighing about 20 gm., to which 2,2-diphenyl-2-propargyl-N-(diethylaminoethyl)acetamide hydrochloride was orally administered as a suspension in water containing gum at increasing doses. The animals were observed for 72 hours. Under these test conditions, the lethal 50% dose ($DL_{50}$), calculated by the Karber method was 720 mg./kg.

Under the same test conditions the lethal 50% dose of N-methyl N - (N' - methyl-phenethylaminoethyl) 2,2-diphenyl - 2 - propargyl-acetamide hydrochloride was 233 mg./kg. intraperitoneally and 2 gm./kg. subcutaneously.

Various modifications of the products and process of the invention may be made without departing from the spirit or scope thereof and it shall be understood that the invention is to be limited only as defined in the appended claims.

We claim:

1. A compound selected from the group consisting of acetamides of the formula

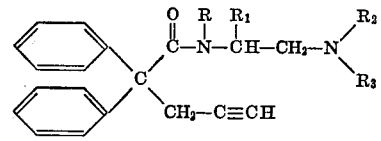

wherein R is selected from the group consisting of hydrogen and alkyl of 1 to 4 carbon atoms, $R_1$ is hydrogen, $R_2$ is alkyl of 1 to 4 carbon atoms and $R_3$ is selected from the group consisting of alkyl of 1 to 4 carbon atoms, phenethyl, and benzyl, or the group

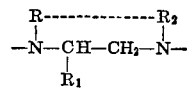

is piperazine, $R_1$ is hydrogen and $R_3$ is benzyl or the group

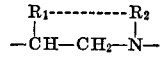

is piperidyl and $R_3$ is ethyl or the group

is pyrrolidino and their non-toxic, pharmaceutically acceptable acid addition salts.

2. A compound of claim 1 selected from the group consisting of N-(diethylaminoethyl)-2,2-diphenyl-2-propargyl-acetamide and its hydrochloride.

3. A compound of claim 1 selected from the group consisting of N - methyl N - (N' - methylphenethylaminoethyl)-2,2-diphenyl-2-propargyl-acetamide and its hydrochloride.

4. A compound of claim 1 selected from the group consisting of N-methyl-N-(β-pyrrolidino-ethyl)-2,2-diphenyl-2-propargyl-acetamide and its hydrochloride.

5. A compound of claim 1 selected from the group consisting of N-(1'-ethyl 3'-piperidyl)-2,2-diphenyl-1-propargyl-acetamide and its hydrochloride.

6. A compound of claim 1 selected from the group consisting of N'-benzyl-N-(2,2-diphenyl-pent-4-yneoyl)-piperazine and its hydrochloride.

References Cited

UNITED STATES PATENTS

| 3,668,251 | 6/1972 | Hamilton | 260—558 |
| 3,573,304 | 3/1971 | Eberle et al. | 260—250 |

HARRY I. MOATZ, Primary Examiner

U.S. Cl. X.R.

260—268 R, 293.76, 326.3, 558 R, 558 P, 469; 424—250, 267, 274, 324